United States Patent [19]

Morin

[11] Patent Number: 5,700,150
[45] Date of Patent: Dec. 23, 1997

[54] ELECTRICAL OUTLET TYPE EXTENSION CORD REEL WITH AUXILIARY OUTLET

[76] Inventor: Aurele Morin, 8635 Marjolaine St., Montreal Quebec, Canada, H1R 2H4

[21] Appl. No.: 609,616

[22] Filed: Mar. 1, 1996

[51] Int. Cl.⁶ .................................................. H01R 13/72
[52] U.S. Cl. .............................. 439/4; 439/652; 439/501; 191/12.4
[58] Field of Search ............................. 439/4, 501, 651, 439/652; 191/12.4, 12.2 R

[56] References Cited

U.S. PATENT DOCUMENTS

| | | | |
|---|---|---|---|
| 2,232,580 | 2/1941 | Wickemeyer | 191/12.4 |
| 2,281,579 | 1/1942 | Benjamin | 191/12.4 |
| 4,138,177 | 2/1979 | Van Valer | 439/4 |
| 5,339,461 | 8/1994 | Luplow | 439/4 |
| 5,562,488 | 10/1996 | Neiser et al. | 439/501 |

*Primary Examiner*—Gary F. Paumen
*Attorney, Agent, or Firm*—Swabey Ogilvy Renault

[57] ABSTRACT

The apparatus is a stackable electrical outlet connector type extension cord reel comprising a body, means extending from the back of said body to secure it onto a duplex electrical wall outlet receptacle by contact with each one of the electrical contacts thereof, means to allow electrical connection of appliances or to carry additional reels on the frontal face of said body, a pulley revolvably positioned on said body and carrying a length of extension cord and provided with means to manually rotate said pulley to rewind said extension cord, a circular cover revolvably assembled on said pulley, the periphery of said cover being provided with an opening through which the extension cord exits the housing of the reel.

10 Claims, 3 Drawing Sheets

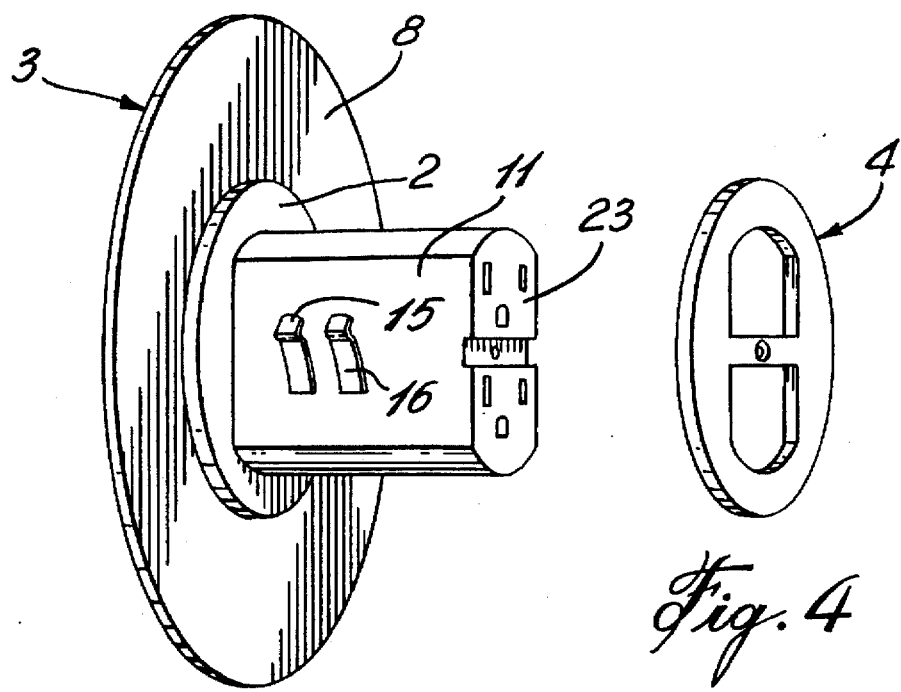
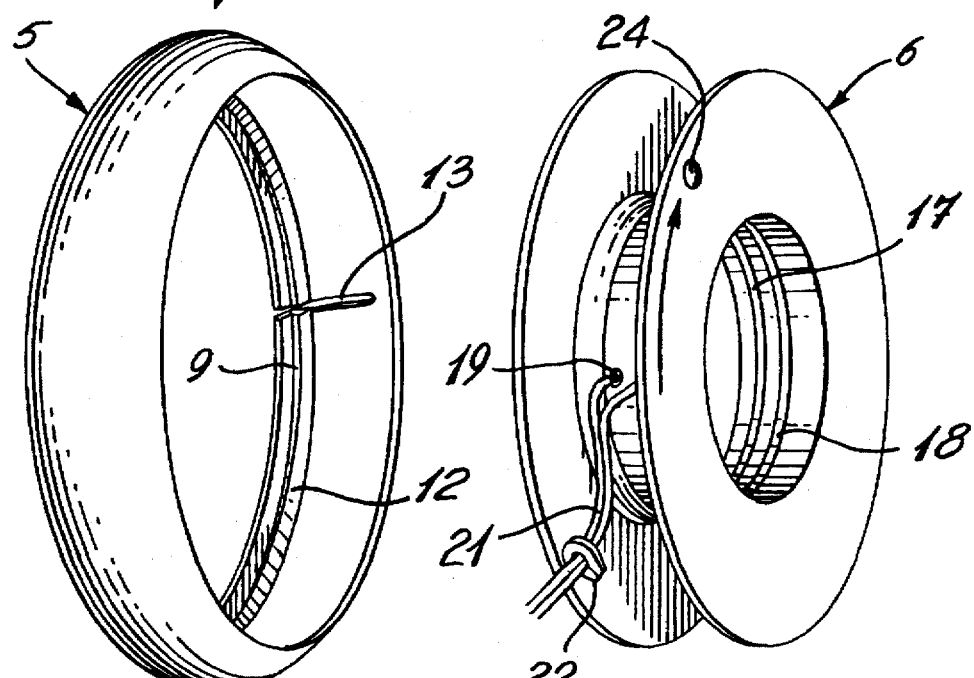

ELECTRICAL OUTLET TYPE EXTENSION CORD REEL WITH AUXILIARY OUTLET

BACKGROUND OF THE INVENTION

1. Field of the Invention

The present invention relates to an electrical extension cord reel adapted to be plugged directly into and carried by an electrical outlet receptacle while providing a fixed electrical outlet receptacle on the frontal face thereof.

2. Brief Description of the Prior Art

Although there is no evidence of such extension cord reels on the market, a few patents have been delivered for extension cord reels which are adapted to be plugged directly into and carried by an electrical outlet receptacle to provide a neat semi-permanent installation of the reel while allowing immediate access to an electrical power supply.

Such a cord reel has been disclosed by R. H. Wickemeyer in U.S. Pat. No. 2,232,580 issued in 1939. Obviously, the concept described in that patent has numerous limitations and drawbacks. First, once the reel is plugged into the electrical outlet receptacle, any appliance, even though it is placed near the outlet, draws high current or requests a ground conductor, can only be connected to the power supply by way of the extension cord, unless the reel is removed and stored elsewhere to allow direct connection into the wall receptacle. Therefore, this reel does not allow for simultaneously connecting appliances that are located at a fair distance from each other and its concept requires the use of a three conductor extension cords of the same current capacity as the electrical circuit supply in order to comply with any load requirement thereby rendering the device heavy, bulky and expensive. Moreover, the use of the spiral spring of the rewind mechanism as one of the contacts connecting the cord to the electrical supply introduces undesirable power loss due to the relatively high electrical resistance of this type of long high carbon steel spring.

It is also worth mentioning that the mounting of the reel onto the receptacle relies only on two adjacent prongs, while one may easily understand that this would cause excessive mechanical stress on the receptacle contacts and eventually poor electrical contact and retention force due to the reel weight and mechanical strain associated with the repeated pulling of the spring loaded cord. It is also noticable that the notch through which the extension cord exits the housing is fixed thereby preventing the cord from automatically aligning with the pull direction thus causing undesirable friction, wear and mechanical stress.

U.S. Pat. No. 2,821,579 issued in 1956 also discloses a spring return cord reel which plugs directly into a electrical wall outlet receptacle but which is particularly intended for use in conjunction with an electric shaver, providing switching features so that electrical power is transmitted through the cord only at desired positions of the pulley. That device, although not intended for use as a general purpose household extension cord reel, does not exhibit improvements in any respect overcoming the limitations and drawbacks detailed hereinabove.

Furthermore, none of the devices cited above or any other device of that type provides the possibility of plugging one or more devices one into the other to constitute a stack providing a plurality of extension cords and still an auxiliary electrical outlet receptacle where the devices are located.

OBJECTS OF THE INVENTION

An object of the present invention is therefore to provide a novel and improved electrical outlet connector type extension cord reel allowing direct connection of appliances into the body thereof.

Another object of the invention is to allow the stacking of an indefinite number of reels on a single duplex wall receptacle, thus providing more than one extension cord to supply various spaced apart appliances at the same time, while still allowing connection of appliances into the body of the device.

Another object of the present invention is to provide access to grounded receptacles and to the total electrical outlet power capacity while the extension cord can feature restricted power handling and possibly not include the ground conductor.

Another object of the present invention is to provide rugged mechanical mounting of the reel onto the electrical outlet receptacle, while improving electrical conduction and power transmission as well as the reliability and durability of both the device and the wall receptacle.

A further object of the present invention is to provide an electrical outlet connector type extension cord reel in which the cord can be maintained substantially along the same orientation from the spool outwardly through the reel housing during unwinding and rewinding.

A still further object of the present invention is to provide means to automatically untangle a flat extension cord during the rewinding operation, in order to efficiently use the inside reel volume and minimize the mechanical stress on the cord conductors.

SUMMARY OF THE INVENTION

More specifically, in accordance with the preferred embodiment of the present invention, there is provided a stackable electrical outlet connector type extension cord reel comprising a body, means extending from the back of the body to secure it onto a duplex electrical wall outlet receptacle by contact with each one of the electrical contacts thereof, means to allow electrical connection of appliances or to carry additional reels on the frontal face of the body, a pulley rotatably mounted in the body and carrying a length of extension cord and provided with means to manually rotate the pulley to rewind the extension cord, a circular cover rotatably assembled on the pulley, the periphery of the cover being provided with an opening through which the extension cord exits the housing of the reel.

The objects, advantages and other features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 3 is a perspective detail view of the body of the extension cord reel;

FIG. 4 is a perspective detail view of the face plate of the extension cord reel;

FIG. 5 is a perspective detail view of the cover of the extension cord reel; and FIG. 6 is a perspective detail view of the pulley of the extension cord reel;

DETAILED DESCRIPTION OF THE PREFERRED EMBODIMENTS

Figure 1:
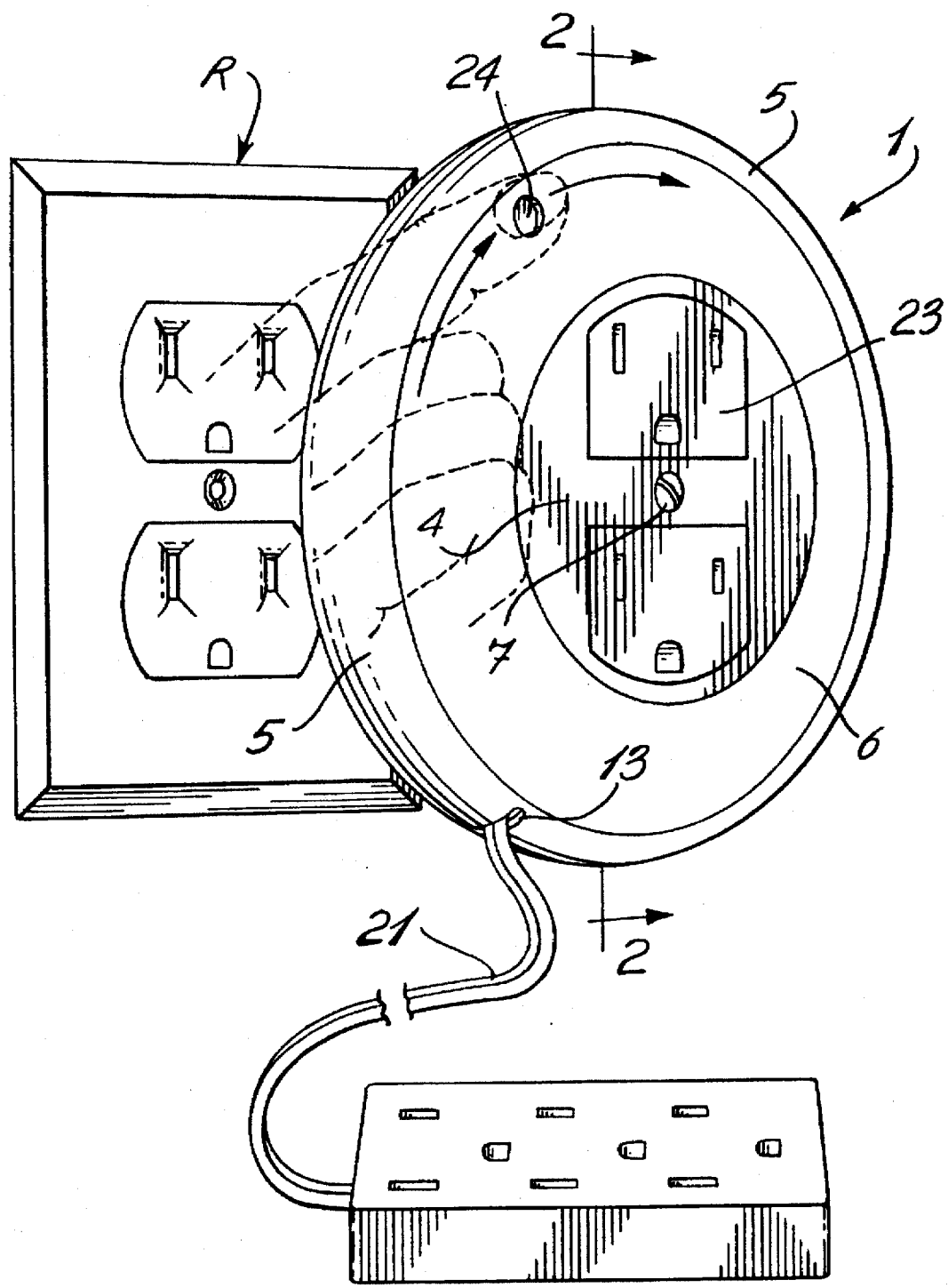
FIG. 1 is a perspective view of an extension cord reel in accordance with the present invention shown next to a conventional electrical wall outlet receptacle.
Figure 2:
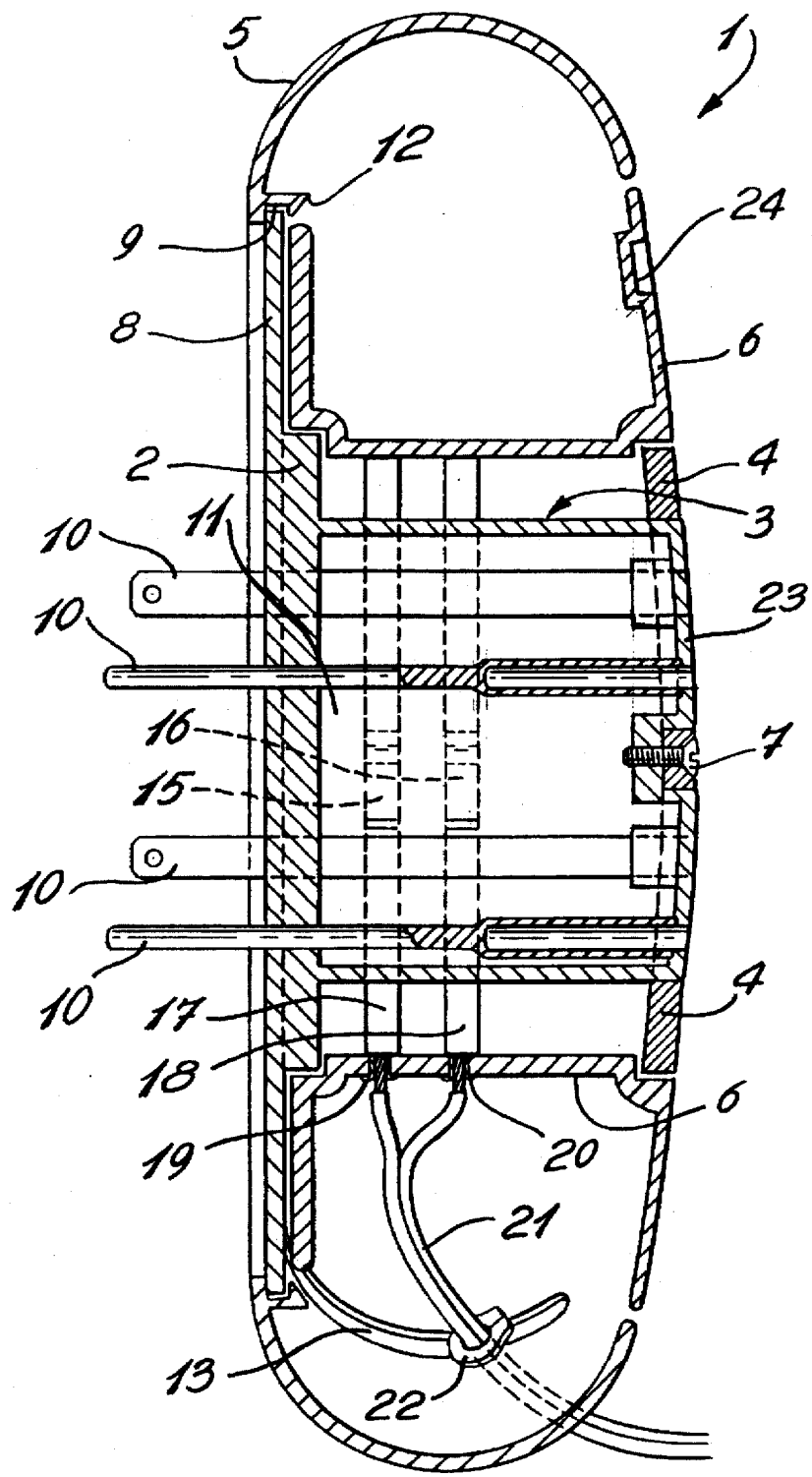
FIG. 2 is a cross-sectioned side elevation of the assembled extension cord reel taken along line 2—2 of FIG. 1.

As illustrated in FIGS. 1 and 2 of the appended drawings, an extension cord reel in accordance with the present invention is generally identified by the reference numeral 1. An inner circular portion 2 of body assembly 3 (detailed in FIG. 3) cooperates with faceplate 4 (detailed in FIG. 4) which forms a pair of rails on which the pulley 6 (detailed in FIG. 6) is rotatably mounted. Faceplate 4 is secured to the frontal part of body 3 by screw 7 and contributes in limiting the travel of pulley 6 along the axis of rotation.

Cover 5 (detailed in FIG. 5) is snapped at its groove 9 onto the outer circular portion 8 of the body 3 and groove 9 provides the appropriate play to allow free rotation of the cover 5 on body 3. The snap action is created by pushing the beveled portion 12 of the cover 5 against the perimeter of the outer circular portion e of the body, while slot 13 provides the necessary compliance to increase the cover inner diameter thus enabling the edge of the outer circular portion s of the body 3 to enter and lock into groove 9.

Each of the prongs 10 extends through the body housing 11 to provide the necessary corresponding contact for the duplex electrical outlet receptacle 23 which is being an integral portion of the body front end. Electrical connections inside the body housing 11 also bring electrical supply from one of the pairs of live prongs 10 of opposite polarities to complient brush contacts 15 and 16 extending outside a lateral face of the body housing, with these brush contacts being dimensional with respect to the pulley 6 to maintain a continuous electrical contact with conductive rails 17 and 18 secured to the inner face of the core of pulley 6, during rotation of the pulley on the fixed body 3. These conductive rails 17 and 18 make electrical contact with the conductors of the extension cord 21 through conductive fasteners 19 and 20 extending through the wall of the pulley core. The extension cord 21 extends out of device 1 through slot 13 of cover 5.

The device 1 is designed to be plugged directly into and be carried by a conventional duplex electrical wall outlet receptacle R through prongs 10 and operates as follows. The outside portion of the extension cord 21 can be pulled manually to unwind the desired length of cord in order to bring electrical supply to remotely located appliances. Simultaneously, other appliances located in the vicinity of the wall receptacle R or requirering a ground conductor or exceeding the current rating of the cord can still be connected into the duplex receptacle 23 on the face of the device. Upon pulling cord 21, cover 5 automatically aligns with the direction of the cord since it is able to freely rotate around the body 3. This feature reduces friction and wear at the area of contact between the slot 13 and the cord 21, while also reducing the required pulling force. Unwinding of the cord 21 is stopped by stop member 22 secured to the inner end the cord 21 to prevent excessive stress at the point of contact between cord conductors and fasteners 19 and 20.

When the time has come to store the extension cord 21 back into the reel, rewinding is simply accomplished by holding the cover 5 in a steady position with one hand while using the other hand to rotate the pulley in the appropriate direction by introducing a finger in the circular hole 24 defined in the frontal face of the pulley 6.

Although the present invention has been described hereinabove by way of preferred embodiments thereof, such embodiments can be modified at will, within the scope of the appended claims, without departing from the spirit and nature of the subject invention.

The embodiments of the invention in which an exclusive property or privilege is claimed are defined as follows:

What is claimed is:

1. An electrical device for connection to an electrical wall outlet, comprising housing means having at least one set of electrical prongs extending rearwardly therefrom for insertion into the wall outlet for detachably mounting said electrical device to the wall outlet, one electrical socket being fixedly provided in a front surface of said housing means for each said set of electrical prongs and being electrically coupled to said electrical prongs, and an electrical extension cord electrically connected to said electrical prongs and displaceable between a retracted and an extended position relative to said housing means, said electrical socket being adapted for receiving the electrical prongs of another similar electrical device in a stacked relationship, whereby a desired number of additional extension cords can be added to the wall outlet by matingly connecting an appropriate number of said electrical devices.

2. An electrical device as defined in claim 1, wherein there are provided two sets of said electrical prongs which extend from said housing means such as to be insertable into a duplex wall outlet.

3. An electrical device as defined in claim 2, wherein there are provided two said electrical sockets in said front surface of said housing means, said electrical sockets being adapted to receive said two sets of electrical prongs of another similar electrical device.

4. An electrical device as defined in claim 1, wherein said electrical extension cord is wound on reel means rotatably mounted on said housing means, said housing means being centrally disposed relative to said reel means.

5. An electrical device for connection to an electrical wall outlet, comprising housing means having at least one set of electrical prongs extending rearwardly therefrom for insertion into the wall outlet for detachably mounting said electrical device to the wall outlet, one electrical socket being fixedly provided in a front surface of said housing means for each said set of electrical prongs and being electrically coupled to said electrical prongs, and reel means with an electrical extension cord wound therearound, said reel means being rotatably mounted around said housing means, said extension cord being electrically connected to said electrical prongs and being displaceable between a retracted and an extended position relative to said reel means, said electrical socket being located inwardly of said reel means thereby providing a single compact connection device.

6. An electrical device as defined in claim 5, wherein there are provided two sets of said electrical prongs which extend from said housing means such as to be insertable into a duplex wall outlet.

7. An electrical device as defined in claim 6, wherein there are provided two said electrical sockets in said front surface of said housing means, said electrical sockets being adapted to receive said two sets of electrical prongs of another identical electrical device simultaneously, said extension cord being provided around said housing means with said electrical prongs and said electrical sockets being provided inwardly of said extension cord thereby providing a compact electrical device.

8. An electrical device as defined in claim 5, wherein said electrical extension cord is wound on reel means rotatably mounted on said housing means, said housing means being centrally disposed relative to said reel means.

9. An electrical device for detachable connection to an electrical duplex wall outlet, comprising hub means having front and rear surfaces, electrical male connection means protruding from said rear surface and comprising two sets of electrical prongs for insertion in the duplex wall outlet, said front surface of said hub means comprising a pair of socket means electrically coupled to said male connection means and adapted to receive the two set of electrical prongs of another identical electrical device simultaneously, electrical conductive means being provided in said hub means, reel means rotatably mounted on said hub means, said reel means having contact means adapted to cooperate with said conductive means to continuously electrically couple said reel means to said male connection means, and an electrical extension cord wound around said reel means, said electrical extension cord being electrically connected to said contact means such that it can be selectively unwound from said reel means for providing electrical power at locations remote from the wall outlet, whereby said electrical device is compact.

10. An electrical device as defined in claim 9, wherein said contact means comprise annular contacts extending on an inside surface of said reel means such as to contact said conductive means and electrically couple said reel means to said male connection means.

* * * * *